(No Model.) 2 Sheets—Sheet 1.
L. H. NASH.
METER REGISTER.
No. 587,106. Patented July 27, 1897.
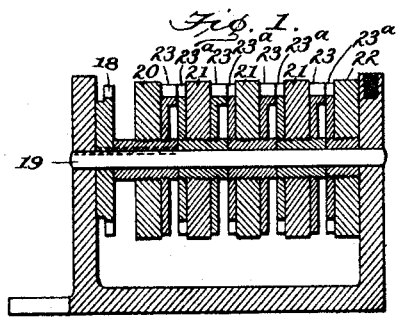
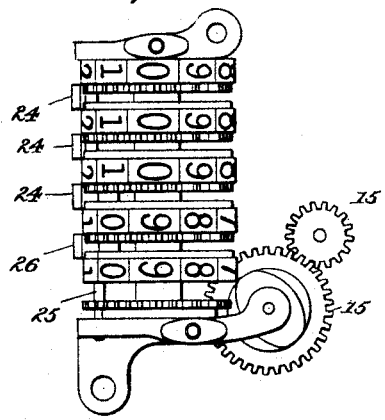
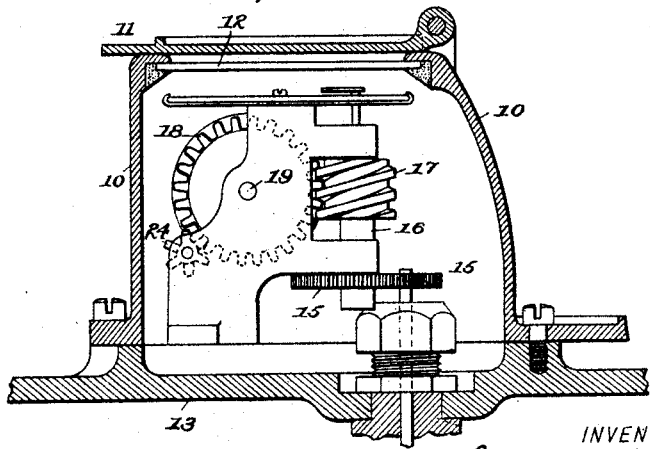
WITNESSES:
Geo. M. Copenhaver.
D. S. Naylor
INVENTOR
Lewis Hallock Nash
BY Johnson & Johnson
ATTORNEYS (No Model.) 2 Sheets—Sheet 2.
L. H. NASH.
METER REGISTER.

No. 587,106. Patented July 27, 1897.

WITNESSES:
Geo. M. Copenhaver.
D. S. Naylor

INVENTOR
Lewis Hallock Nash
BY
Johnson and Johnson
ATTORNEYS

UNITED STATES PATENT OFFICE.

LEWIS HALLOCK NASH, OF SOUTH NORWALK, CONNECTICUT, ASSIGNOR TO THE NATIONAL METER COMPANY, OF NEW YORK, N. Y.

METER-REGISTER.

SPECIFICATION forming part of Letters Patent No. 587,106, dated July 27, 1897.

Original application filed April 28, 1896, Serial No. 589,430. Divided and this application filed December 22, 1896. Serial No. 616,624. (No model.)

*To all whom it may concern:*

Be it known that I, LEWIS HALLOCK NASH, a citizen of the United States, and a resident of South Norwalk, in the county of Fairfield and State of Connecticut, have invented certain new and useful Improvements in Meter-Registers, of which the following is a specification, being a divisional application of an application filed by me April 28, 1896, under Serial No. 589,430, for a meter-register.

My invention relates to registers, and is especially adapted to the register of a water-meter, although it might be used for other purposes; and it consists of certain novel parts and combinations of parts particularly pointed out in the claim concluding this specification.

The following is a description of the meter-register embodying my invention in the forms which are at present preferred by me, but it will be understood that various modifications and changes may be made without departing from the spirit of my invention and without exceeding the scope of the concluding claim.

Figure 4:
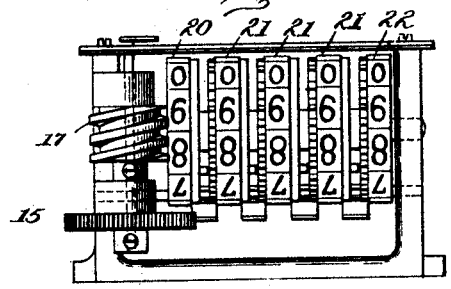
Figure 5:
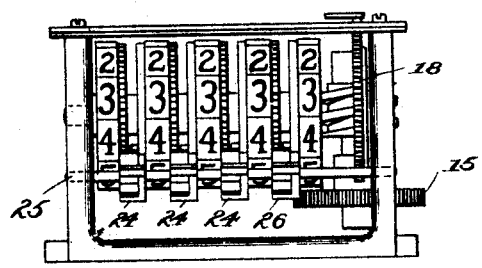
Figure 6:
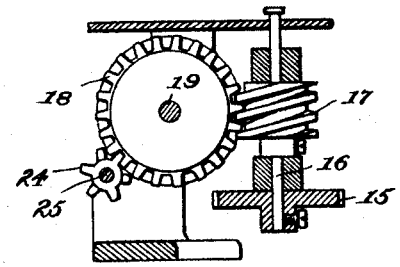

In the accompanying drawings, Figure 1 is a longitudinal section through a part of the meter-register. Fig. 2 is a top view of the registering apparatus removed from the case. Fig. 3 is a cross-section through the case in front of the register. Figs. 4 and 5 are elevations of the registering mechanism from opposite sides. Fig. 6 is an end view, partly in section.

The following is a description of the structure shown in the said drawings.

Referring to Fig. 3, 10 is the case, provided with a cover 11, hinged thereto.

12 is a plate of glass through which the dials may be read.

13 is the upper part of the case, containing the meter proper.

14 is a spindle operated by the meter-piston.

15 15 are gear-wheels connecting the spindle 14 with the shaft 16, which carries a worm 17. The worm 17 meshes with the gear-teeth on the wheel 18, which is carried by a shaft 19, to which it is rigidly attached, for example, by a key, as shown in Fig. 1, or by friction.

20 is an index-wheel, which is also keyed to the shaft 19. 21, 21, 21, and 22 are similar index-wheels loosely mounted on the shaft 19.

23 are two lateral spurs, and 23ª are complete spur-gears attached to the sides of the wheels.

24 24 24 are pinions loosely mounted on a shaft 25, while 26 is a similar pinion rigidly attached to said shaft. These pinions each intermesh with teeth and spurs on adjacent wheels in such a manner that one wheel is caused to advance one step at each complete rotation of its fellow. This is accomplished by reason of the fact that each of the pinions 24 is in driving relation with one wheel and driven relation with its fellow. It is only driven, however, one step at each complete rotation of the driving-wheel, at other times remaining at rest. As this construction is now well known in the art, a fuller description is deemed unnecessary.

As the pinion 26 is rigidly attached to shaft 25, this shaft is caused to move every time the wheel 20 makes a complete rotation. The effect of this is to prevent the pinions 24 24 24 sticking or becoming fast to the shaft by corrosion, as they are only moved at long intervals. This is a danger which is particularly incident to the use of such registers in connection with water-meters which are set in damp places or even underground. I have ascertained by experience that if the shaft 25 be allowed to remain stationary the pinions 24 24 24 (especially those which are connected with the wheels representing higher denominations) are apt to become fast to the shaft before they are moved, and this results in the destruction of the register, whereas the periodic movement of the shaft 25, on which they are loosely mounted, effectually prevents such condition.

Instead of rigidly attaching the pinion 26 to the shaft 25 the shaft might be made loose in its bearings, so that it would turn by friction, more or less, as these pinions turn without either of them being, properly speaking, rigidly connected thereto. This would effect substantially the same result, provided there be sufficient friction between the pinions and the shaft to insure its revolving at not too frequent intervals.

In the foregoing specification I have incidentally referred to some of the modifications which might be adopted in the practice of my invention; but I have not endeavored to specify all the modifications which might be adopted, the object of this specification being to instruct persons skilled in the art to practice my invention in its present preferred form and to enable them to understand its nature, and I desire it to be distinctly understood that mention by me of a few modifications is in no way intended to exclude others not referred to, but which are within the spirit and scope of my invention.

Many of the details and combinations illustrated and above described are not essential to the several inventions, broadly considered. All this will be indicated in the concluding claim, where the omission of an element or the omission of reference to the detail features of the elements mentioned is intended to be a formal declaration of the fact that the omitted elements or features are not essential to the invention therein covered.

What I claim is—

In a registering device the combination with a series of index-wheels, of a series of pinions intervening between and intermittently actuated by said wheels, one of said pinions being rigidly mounted on its shaft and the others being loosely mounted thereon and driving mechanism independent of said pinion-shaft applied to said index-wheels.

Signed at Brooklyn, in the county of Kings and State of New York, this 18th day of December, A. D. 1896.

LEWIS HALLOCK NASH.

Witnesses:
JOHN H. NORRIS,
CHAS. H. SERGEANT.